(12) United States Patent
Kim

(10) Patent No.: US 6,316,729 B1
(45) Date of Patent: Nov. 13, 2001

(54) CABLE DUCT DEVICE FOR RACK

(75) Inventor: Tae-Ryong Kim, Kyongsangbuk-do (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/461,178

(22) Filed: Dec. 14, 1999

(30) Foreign Application Priority Data

Dec. 30, 1998 (KR) .................................................. 98-60923

(51) Int. Cl.[7] ...................................................... H02G 3/04
(52) U.S. Cl. ........................ 174/68.3; 174/101; 174/99 R
(58) Field of Search ................................. 174/68.3, 72 A, 174/64, 65 R, 95, 99 R, 101, 99 E

(56) References Cited

U.S. PATENT DOCUMENTS

| | | | |
|---|---|---|---|
| D. 402,264 | 12/1998 | Carlson, Jr. et al. | D13/155 |
| 5,086,195 | * 2/1992 | Claisse | 174/101 |
| 5,235,136 | * 8/1993 | Santucci et al. | 174/68.3 |
| 5,683,001 | 11/1997 | Masuda et al. | 211/26 |
| 5,728,976 | 3/1998 | Santucci et al. | 174/135 |
| 5,929,381 | 7/1999 | Daoud | 174/72 A |
| 6,140,584 | * 10/2000 | Baldissara | 174/68.3 |

* cited by examiner

Primary Examiner—Dean A. Reichard
Assistant Examiner—W. David Walkenhorst
(74) Attorney, Agent, or Firm—Robert E. Bushnell, Esq.

(57) ABSTRACT

Disclosed is a cable duct device for a rack capable of not only allowing cables to be easily held therein and to be easily released therefrom, but also stably holding cables therein even when external impact is applied thereto. The cable duct device includes a pair of duct assemblies coupled to each other while defining a cable receiving space therebetween. Each duct assembly includes a base having a square or rectangular plate shape, front and rear ribs extending upwardly from an edge of the base at opposite sides of the base, respectively, a plurality of vertically-spaced traverse ribs arranged between the front and rear ribs and adapted to connect the front and rear ribs to each other, a first elbow extending inwardly from an upper end of the front rib at one end thereof while being inwardly bent, a second elbow extending inwardly from an upper end of the rear rib at one end thereof while being inwardly bent, and an opening bar hingably connected to the other end of the first elbow in such a fashion that it hinges between a position closing the cable receiving space and a position opening the cable receiving space.

35 Claims, 5 Drawing Sheets

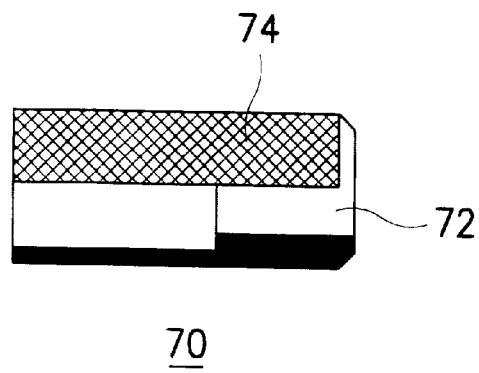
FIG. 3
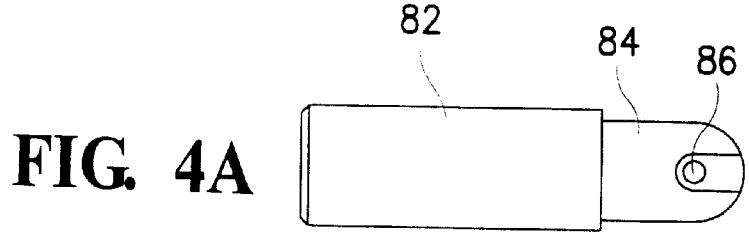
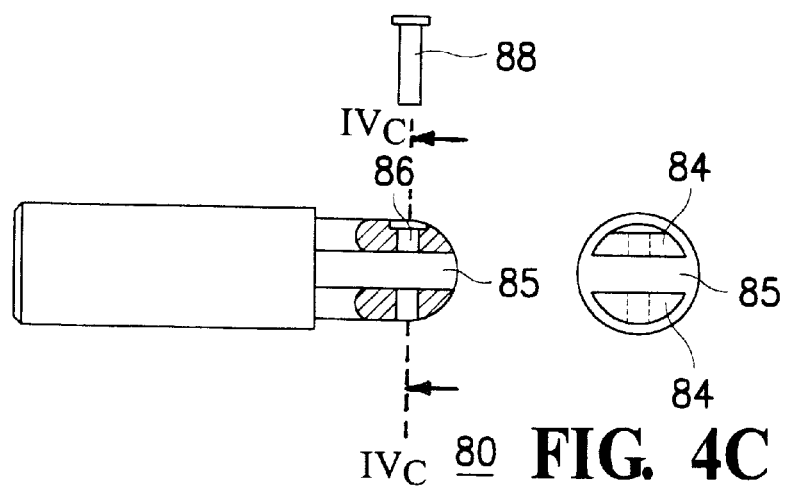
FIG. 4A
FIG. 4B
FIG. 4C

CABLE DUCT DEVICE FOR RACK

CLAIM OF PRIORITY

This application makes reference to, incorporates the same herein, and claims all benefits accruing under 35 U.S.C. §119 from my application CABLE DUCT DEVICE FOR RACK filed with the Korean Industrial Property Office on Dec. 30, 1998 and there duly assigned Serial No. 60923/1998.

BACKGROUND OF THE INVENTION

1. Field of the Invention

The present invention relates to a cable duct device for a rack, and more particularly to a cable duct device for a rack having a configuration capable of allowing cables to be easily received in an arranged state in the rack and to be easily released therefrom, without using no separate cover.

2. Description of the Prior Art

Typically, communication equipment, for example, an exchanger, includes a rack having a cabinet shape, a plurality of printed circuit boards mounted on a shelf formed in the rack, a mother board combined with the printed circuit boards, and a number of cables interconnecting a communication circuit in the shelf with subscribers.

The cables are collected at a side of the rack and bound with strips. Alternatively, several bundles of the cables are respectively put in a cable duct device which is fixed to the rack.

One conventional cable duct device includes a duct and a cover. A bundle of cables is held in the duct, and then the cover is coupled to the duct. Typically, the duct and cover are made of a synthetic resin material.

The duct includes a pair of bent plates each having an L shape. Each of the bent plates has a plurality of slots at one wall thereof. The walls of the bent plates formed with the slots face each other. Tension portions are formed at both ends of the duct corresponding to respective free ends of the bent plates.

The duct cover is provided at both ends thereof with coupling portions, respectively. The coupling portions have an inwardly bent shape. The coupling portions of the duct cover are engaged with the tension portions of the duct, so that the duct cover is coupled to the duct.

Where cables are held in a rack by use of the above mentioned conventional cable duct device, however, there is a problem in that a degradation in workability occurs in processes for an installation of additional cables in the rack or a repair of the rack because the duct cover must be separated from the duct. Furthermore, the appearance of the duct device is degraded due to the cables held therein because there is no structure for holding the cables in good shape within the cable duct device.

Furthermore, there is a problem in that the conventional cable duct device exhibits a degraded stability. For example, after an earthquake-proof test conducted for the conventional cable duct device, it can be found that the duct cover is very easily separated from the duct even when a small amount of external impact is applied to the cable duct device.

Other examples of cable holding devices are seen, for example, in the following U.S. Patents. U.S. Pat. No. 5,683,001, to Masuda et al., entitled Rack For Mounting Electronic Apparatuses, describes a rack with C-shaped posts whose recesses are used as cable ducts. U.S. Pat. No. 5,728,976, to Santucci et al., entitled Detachable cover For Wire Ducts Having A Living Hinge, describes a cable duct system having a hinged cover. U.S. Pat. No. 5,929,381, to Daoud, entitled Signal Transmission Media Routing Arrangement With Rectangular Distribution Rings, describes an arrangement having external troughs for guiding wires. The exterior trough has a frame having an opening for inserting a wire. U.S. Pat. No. Design 402,264, entitled Cable Duct, illustrates a cable duct having a cover portion and a base portion, with the cover portion apparently held by tension in the base portion.

Based on our reading of the art, we have decided that what is needed is a cable duct device which does not suffer from the above problems.

SUMMARY OF THE INVENTION

It is therefore an object of the present invention to provide an improved cable duct device for a rack.

It is a further object of the present invention to provide a cable duct device for a rack capable of holding cables in an arranged state therein without using a separate cover.

It is another object of the present invention to provide a cable duct device for a rack capable of allowing cables to be easily held therein and to be easily released therefrom.

It is still another object of the present invention to provide a cable duct device for a rack capable of stably holding cables therein even when external impact is applied thereto.

A yet further object of the invention is to provide a cable duct device which is earthquake-resistant.

A still further object of the invention is to provide a cable duct device which does not suffer a loss in its appearance when fill of cables.

The present invention has been made to overcome the above-described problems of the conventional art. To accomplish the above objects of the present invention, there is provided a cable duct device for a rack comprising: a pair of duct assemblies coupled to each other while defining a cable receiving space therebetween, each of the duct assemblies comprising a base having a square or rectangular plate shape, front and rear ribs extending upwardly from an edge of the base at opposite sides of the base, respectively, a plurality of vertically-spaced traverse ribs arranged between the front and rear ribs and adapted to connect the front and rear ribs to each other, a first elbow extending inwardly from an upper end of the front rib at one end thereof while being inwardly bent, a second elbow extending inwardly from an upper end of the rear rib at one end thereof while being inwardly bent, and an opening bar hingeably connected to the other end of the first elbow in such a fashion that it hinges between a position closing the cable receiving space and a position opening the cable receiving space.

BRIEF DESCRIPTION OF THE DRAWINGS

A more complete appreciation of the invention, and may of the attendant advantages, thereof, will be readily apparent as the same becomes better understood by reference to the following detailed description when considered in conjunction with the accompanying drawings in which like reference symbols indict same or similar components, wherein:

FIG. 3 is a partially-broken side view illustrating a slider of the cable duct device according to the present invention;

FIGS. 4A to 4C show an opening bar of the cable duct device according to the present invention, in which FIG. 4A is a side view of the opening bar, FIG. 4B is a partially-broken plan view of the opening bar, and FIG. 4C is a cross-sectional view taken along the line IVC—IVC in FIG. 4B;

DETAILED DESCRIPTION OF THE PREFERRED EMBODIMENT

Figure 1:
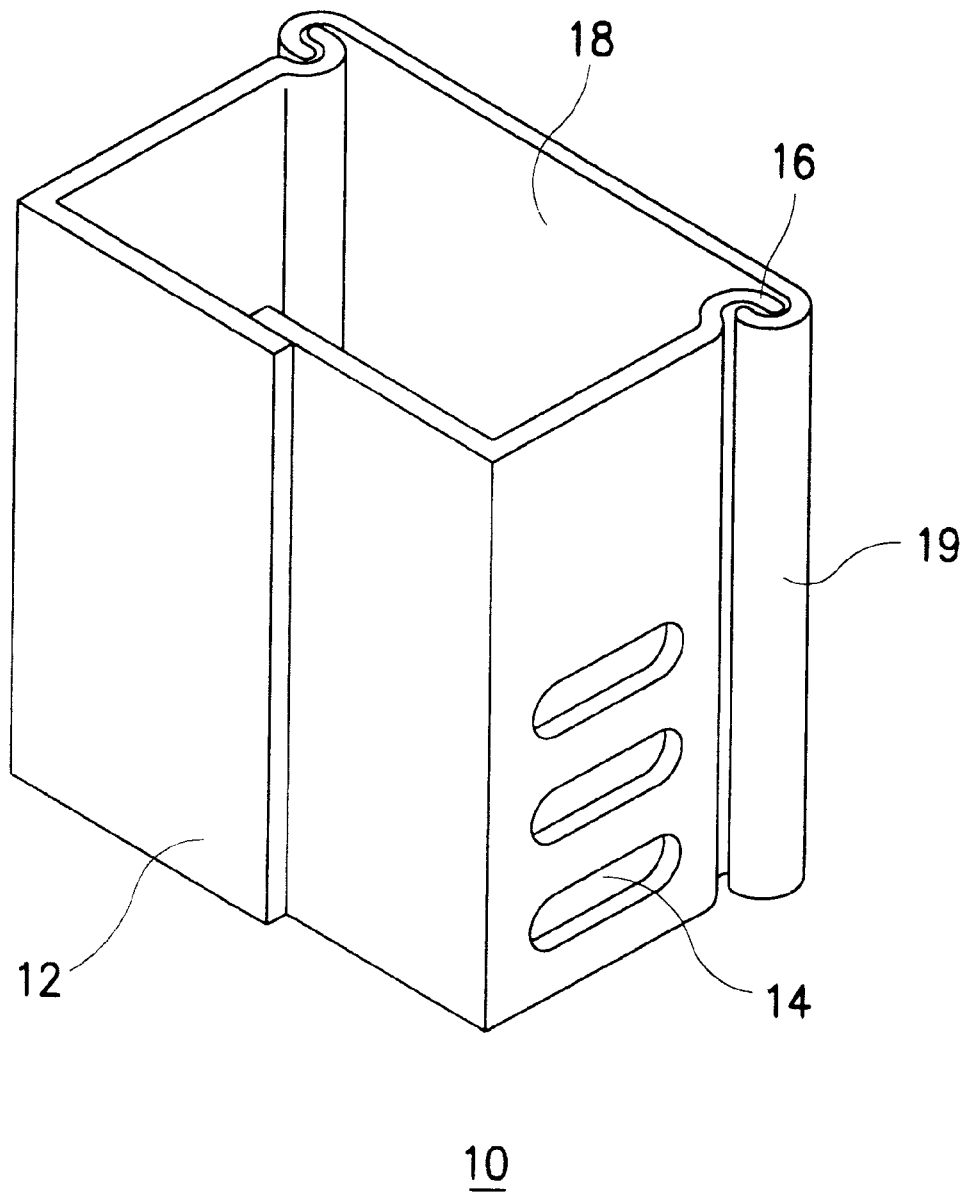
FIG. 1 is perspective view illustrating a conventional cable duct devices.

Turning now to the drawings, FIG. 1 is a perspective view illustrating an example of a conventional cable duct device. As shown in FIG. 1, the conventional cable duct device includes a duct 12, and a cover 18. A bundle of cables is held in the duct 12, and then the cover 18 is coupled to the duct 12. Typically, the duct 12 and cover 18 are made of a synthetic resin material.

The duct 12 includes a pair of bent plates each having an L shape. Each of the bent plates has a plurality of slots 14 at one wall thereof. The walls of the bent plates formed with the slots 14 face each other. Tension portions 16 are formed at both ends of the duct 12 corresponding to respective free ends of the bent plates.

The duct cover 18 is provided at both ends thereof with coupling portions 19, respectively. The coupling portions 19 have an inwardly bent shape. The coupling portions 19 of the duct cover 18 are engaged with the tension portions 16 of the duct 12, so that the duct cover 18 is coupled to the duct 12.

Figure 2:
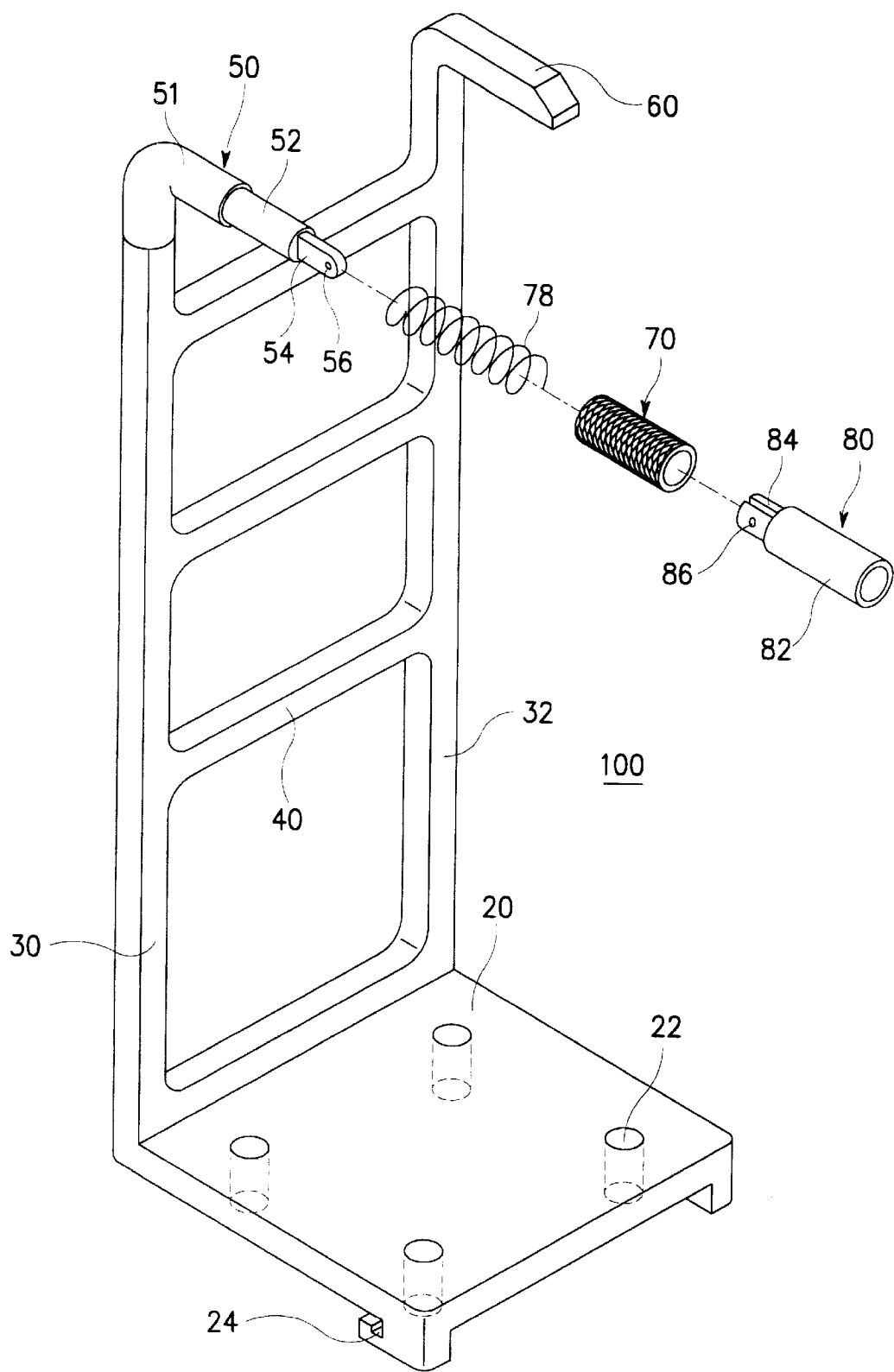
FIG. 2 is a perspective view of a cable duct device according to a preferred embodiment of the present invention.
Figure 5:
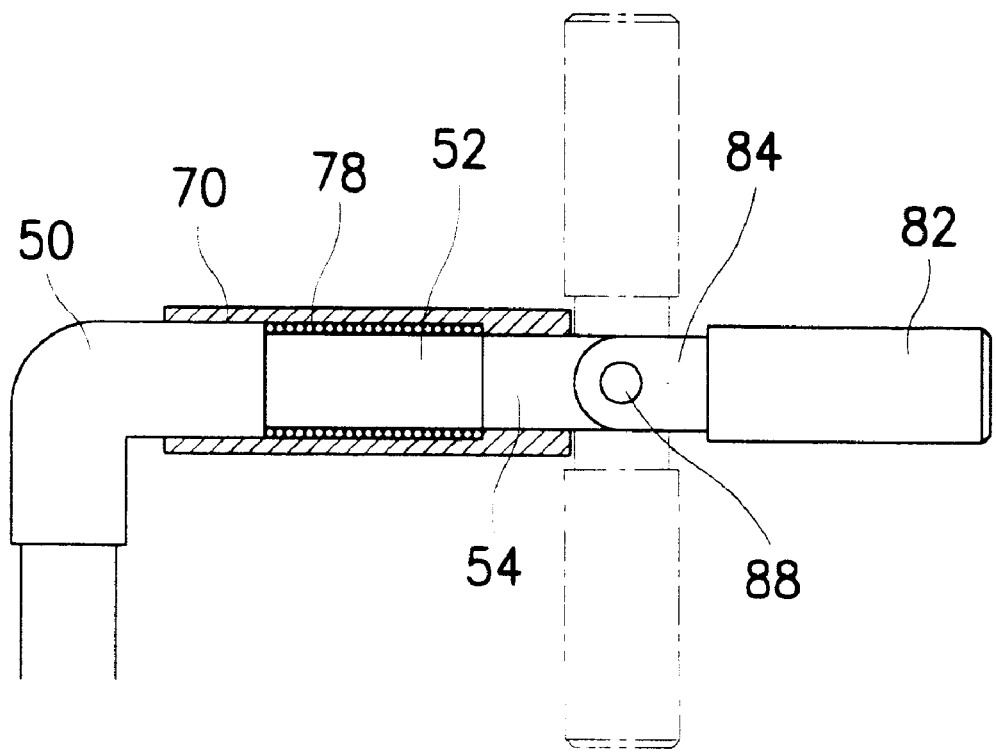
FIG. 5 shows a view illustrating operations of the pipe-shaped slider and opening bar included in the cable duct device according to the present invention.
Figure 6:
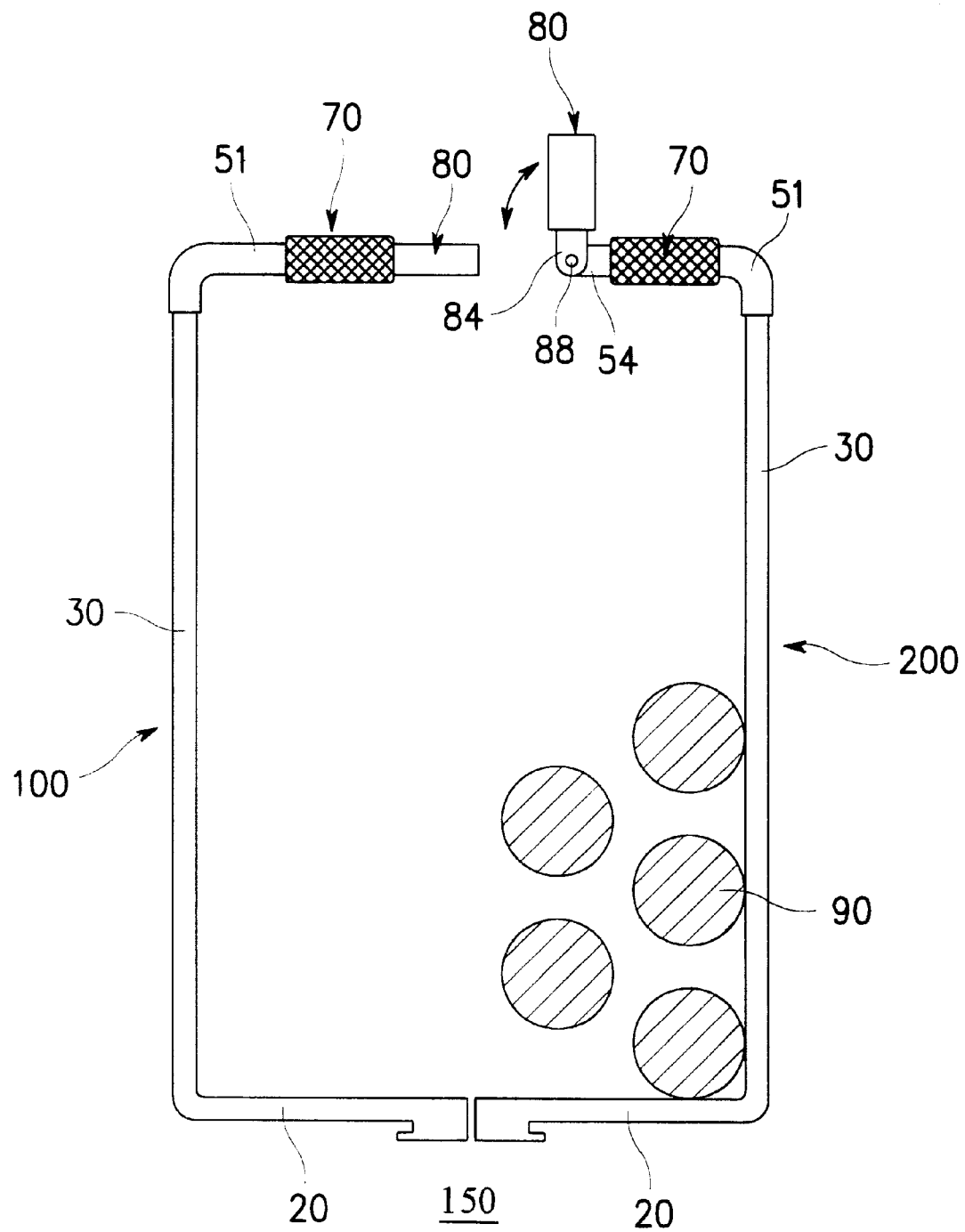
FIG. 6 is a sectional view of the cable duct device according to the present invention.

Hereinafter, a cable duct device according to a preferred embodiment of the present invention will be described in detail with reference to the accompanying drawings. FIG. 2 is a perspective view illustrating a cable duct assembly 100 of a cable duct device according to a preferred embodiment of the present invention. FIG. 3 is a partially-broken side view illustrating a slider 70 of the cable duct device 100 according to the present invention. FIGS. 4A to 4C show an opening bar 80 of the cable duct device 100 according to the present invention, in which FIG. 4A is a side view of the opening bar 80, FIG. 4B is a partially-broken plan view of the opening bar 80, and FIG. 4C is a cross-sectional view taken along the line IVC—IVC in FIG. 4B. FIG. 5 shows operations of the pipe-shaped slider 70 and opening bar 80 included in the cable duct assembly 100 according to the preferred embodiment of the present invention. FIG. 6 is a sectional view of the cable duct device 150 according to the present invention.

As shown in FIGS. 2 to 6, the cable duct device 150 according to the present invention includes two duct assemblies 100 and 200 which are symmetric with each other. Each of the duct assemblies 100 and 200 includes a base 20, a front rib 30, a rear rib 32, a plurality of traverse ribs 40, a first elbow 50, a second elbow 60, a pipe-shaped slider 70 and an opening bar 80.

As shown in FIG. 2, the base 20 has a square or rectangular shape and is formed with a plurality of through holes 22 perforated therein. The through holes 22 are formed to extend vertically through the base 20. Furthermore, legs 24 are formed on a lower surface of the base 20 at opposite sides of the base 20 in such a fashion that they are downwardly protruded from the base 20.

Referring to FIG. 2, the front rib 30 and the rear rib 32 respectively extend upwardly from an edge of the base 20 at opposite sides of the base 20. The traverse ribs 40 are connected between the front and rear ribs 30 and 32 while being vertically spaced from one another to connect the front rib 30 with the rear rib 32. By the above mentioned configurations of the front rib 30, rear rib 32, and traverse ribs 40, the associated duct assembly 100 or 200 has a ladder shape.

The first elbow 50 includes an elbow-shaped pipe 51 fitted at one end thereof around an upper end of the front rib 30, a rod 52 extending from the other end of the elbow-shaped pipe 51 at one end thereof and having a smaller diameter than the elbow-shaped pipe 51, and a key 54 protruding from the other end of the rod 52 and having a traverse through hole 56 therein.

As shown in FIGS. 2, 3 and 5, the slider 70 has a pipe shape in such a fashion that the rod 52 of the first elbow 50 is fitted therein. The slider 70 is slidable on the peripheral surface of the rod 52 along the rod 52. As shown in FIG. 3, the pipe-shaped slider 70 has a step portion 72 protruded from an inner peripheral surface thereof. A spring 78 is disposed in the slider 70 while being supported between the other end of the elbow-shaped pipe 51 and the step portion 72 of the slider 70.

The spring 78 provides a resilient force serving to urge the slider 70 in a direction away from the elbow-shaped pipe 51. When an operator releases the slider 70 in a state in which the slider 70 is moved by the operator toward the elbow-shaped pipe 51 against the resilient force of the spring 78, the slider 70 is automatically returned to an original position away from the elbow-shaped pipe 51.

In addition, knurls 74 are formed on the outer peripheral surface of the slider 70 so that it is convenient for the operator to hold and move the slider 70 in lateral directions along the rod 52. The knurls 74 may be formed by machining the outer peripheral surface of the slider 70 by means of a knurling tool.

As shown in FIGS. 4 and 5, the opening bar 80 has a cylindrical rod 82, a pair of spaced extensions 84 extending parallel to each other from one end of the cylindrical rod 82 to define a key groove 85 for receiving the key 54 therebetween while having pin holes 86 perforated therethrough respectively, and a pin 88 extending through the pin holes 86 of the extensions 84 and the through hole 56 of the key 54 to connect the opening bar 80 to the rod 52. By this configuration, the opening bar 80 can hinge about the pin 88 so that it can selectively provide an opening serving as an access to the interior of the cable duct device.

As shown in FIG. 2, the second elbow 60 is formed at the upper end of the rear rib 32 in such a manner that it extends from the upper end of the rear rib 32 while being inwardly bent. The second elbow 60 has a length shorter than the entire length of the elements coupled to the first elbow 50 in order to allow ease of placing and holding cables in the cable duct device and releasing those cables from the cable duct device.

Hereinafter, coupling of the cable duct assemblies 100 and 200 and operations of the slider 70 and opening bar 80 according to the present invention will be described with reference to FIGS. 5 and 6.

As described above, the cable duct device according to the present invention is obtained by assembling two duct assemblies 100 and 200 together in a state in which they are symmetric to each other. In the cable duct device, cables are received in a space defined between the assembled duct assemblies 100 and 200.

Unless the operator moves the slider 70 toward the first elbow 50, the slider 70 is in a state in which it covers the key 54 and extensions 84. In this state, the opening bar 80 is prevented from being hinged due to the slider 70. That is, the opening bar 80 is held at a position closing the interior of the cable duct device, as shown by the left portion of FIG. 6.

When the operator moves the slider 70 toward the elbow-shaped pipe 51, the opening bar 80 can be freely hinged. In this state, it is possible to open the cable duct device by hinging the opening bar 80 about the pin 88. In the open state of the opening bar 80, the operator can put cables 90 in the duct assemblies 100 and 200 or release cables from those duct assemblies.

When the operator releases the slider 70 after putting or releasing the cables in/from the duct assemblies 100 and 200, the slider 70 moves to the opening bar 80 by virtue of the resilient force of the spring 78 disposed in the slider 70, so that it covers again the key 54 and extensions 84.

As apparent from the above description, the present invention provides a cable duct device for a rack which has a configuration capable of allowing cables to be easily received in an arranged state in the rack and to be easily released therefrom, without using no separate cover. Therefore, cables can be easily put or released in/from the cable duct device. Furthermore, there is an advantage in that the cable duct device of the present invention can stably hold the cables without any separation of the components thereof even when an external force is applied thereto.

While the present invention has been particularly shown and described with reference to a particular embodiment thereof, it will be understood by those skilled in the art that various changes in form and detail may be effected therein without departing away from the scope of the invention as defined by the appended claims.

What is claimed is:

1. A cable duct device for a rack, comprising:
   a pair of duct assemblies coupled to each other while defining a cable receiving space therebetween, each of said duct assemblies comprising:
   a base;
   front and rear ribs extending upwardly from said base;
   at least one traverse rib arranged between said front and rear ribs and adapted to connect said front and rear ribs to each other;
   a first elbow having a first end extending from an upper end of said front rib and having a second end;
   a second elbow extending from an upper end of said rear rib; and
   an opening bar hingeably connected to said second end of said first elbow to hinge between a first position closing the cable receiving space and a second position opening the cable receiving space, said opening bar being positioned over a center portion of said base.

2. The cable duct device of claim 1, said opening bar extending a first distance away from said front rib when said opening bar is in a closed position closing the cable receiving space, said second elbow extending a second distance away from said rear rib, said first distance being greater than said second distance.

3. The cable duct device of claim 2, said opening bar being spaced apart from said front rib by said first elbow and being located on a top side of the cable duct device.

4. The cable duct device of claim 2, said opening bar extending a third distance away from said front rib when said opening bar is in an open position opening the cable receiving space, said third distance being less than said first distance.

5. The cable duct device of claim 4, said opening bar being spaced apart from said front rib by said first elbow and being located on a top side of the cable duct device.

6. The cable duct device of claim 1, said opening bar being spaced apart from said front rib by said first elbow and being located on a top side of the cable duct device.

7. The cable duct device of claim 1, said at least one traverse rib corresponding to a plurality of vertically-spaced traverse ribs.

8. The cable duct device of claim 1, said base, said front rib, and said rear rib being substantially rigid and being joined together rigidly, and rigidly forming the cable receiving space.

9. A cable duct device, comprising:
   a first cable duct assembly and a second cable duct assembly symmetrical to and symmetrically arranged to said first cable duct assembly, said first and second cable duct assemblies together defining a cable receiving space, each cable duct assembly comprising:
   a base;
   a front rib extending from one edge of the base and extending up from said base;
   a rear rib extending up from said base;
   at least one traverse rib connecting a portion of said front rib to a portion of said rear rib;
   a first elbow formed on an end of said front rib, said first elbow extending from said front rib;
   an opening bar hinged to an end of said first elbow, said opening bar extending a first distance away from said front rib when said opening bar is in a closed position closing the cable receiving space; and
   a second elbow formed on an end of said rear rib, said second elbow extending a second distance away from said rear rib, said first distance being greater than said second distance.

10. The cable duct device of claim 9, said opening bar extending a third distance away from said front rib when said opening bar is in an open position opening the cable receiving space, said third distance being less than said first distance.

11. The cable duct device of claim 10, said opening bar being spaced apart from said front rib by said first elbow, being over said base, and being located on a top side of the cable duct device.

12. The cable duct device of claim 9, said opening bar being spaced apart from said front rib by said first elbow, being over said base, and being located on a top side of the cable duct device.

13. The cable duct device of claim 9, said at least one traverse rib corresponding to a plurality of vertically-spaced traverse ribs.

14. The cable duct device of claim 9, said base, said front rib, and said rear rib being substantially rigid and being joined together rigidly, and rigidly forming the cable receiving space.

15. A cable duct device for a rack, comprising:
   a pair of duct assemblies coupled to each other while defining a cable receiving space therebetween, each of said duct assemblies comprising:
   a base;
   front and rear ribs extending upwardly from said base;
   at least one traverse rib arranged between said front and rear ribs and adapted to connect said front and rear ribs to each other;
   a first elbow having a first end extending from an upper end of said front rib and having a second end;

a second elbow extending from an upper end of said rear rib; and an opening bar hingeably connected to said second end of said first elbow to hinge between a first position closing the cable receiving space and a second position opening the cable receiving space;

said first elbow comprising an elbow-shaped pipe mounted to said upper end of said front rib at one end thereof, a rod extending inwardly from the other end of said elbow-shaped pipe at one end thereof and having a diameter smaller than said elbow-shaped pipe, and a key extending inwardly from the other end of said rod and having a traverse through hole;

said opening bar comprising a cylindrical rod, a pair of spaced extensions extending from one end of said cylindrical rod while defining a key hole for receiving the key of the first elbow, pin holes respectively perforated through the extensions, and a pin extending through said pin holes of said extensions and said through hole of said key to connect said opening bar to said first elbow.

16. A cable duct device for a rack as claimed in claim 15, wherein each of said duct assemblies further comprises:

a pipe-shaped slider slidably fitted around said rod of the first elbow.

17. A cable duct device for a rack as claimed in claim 16, wherein said pipe-shaped slider comprises:

a step portion formed on an inner peripheral surface of said slider; and a spring disposed in said pipe-shaped slider and supported between said step portion and said one end of said rod in such a fashion that the spring always urges said slider toward a position where said opening bar is prevented from hinging to its opening position by said slider.

18. A cable duct device for a rack as claimed in claim 16, wherein said slider further comprises knurls formed on an outer peripheral surface of said slider.

19. A cable duct device for a rack, comprising:

a pair of duct assemblies coupled to each other while defining a cable receiving space therebetween, each of said duct assemblies comprising:

a base;

front and rear ribs extending upwardly from said base;

at least one traverse rib arranged between said front and rear ribs and adapted to connect said front and rear ribs to each other;

a first elbow having a first end extending from an upper end of said front rib and having a second end;

a second elbow extending from an upper end of said rear rib; and an opening bar hingeably connected to said second end of said first elbow to hinge between a first position closing the cable receiving space and a second position opening the cable receiving space;

said base being provided at a lower surface thereof with base legs respectively protruded from said lower surface of said base at opposite sides of said base.

20. A cable duct device, comprising:

a first cable duct assembly and a second cable duct assembly symmetrical to and symmetrically arranged to said first cable duct assembly, each cable duct assembly comprising:

a base;

a front rib extending up from said base;

a rear rib extending up from said base;

at least one traverse rib connecting a portion of said front rib to a portion of said rear rib;

a first elbow formed on an end of said front rib, said first elbow extending from said front rib;

an opening bar hinged to an end of said first elbow; and a second elbow formed on an end of said rear rib, said second elbow having an end which is closer to said rear rib than said opening bar is to said front rib when said opening bar is extended from said front rib;

said first elbow further comprising:

a key formed at said end of said first elbow, for hinging to said opening bar;

a rod formed in the portion of said first elbow adjacent to said key;

a slider mounted over said rod, said slider comprising a pipe having a step portion protruding from an inner peripheral surface of the pipe; and a spring disposed in said slider and around said rod portion of said first elbow, for providing resilient force between said first elbow and said slider.

21. The cable duct device of claim 8, further comprising:

extensions formed in said opening bar, said extensions having pin holes;

said key having a through-hole; and a pin extending through the pin holes of said opening bar and the through-hole of said key, for hinging the opening bar to said key.

22. A cable duct device, comprising:

a first cable duct assembly and a second cable duct assembly symmetrical to and symmetrically arranged to said first cable duct assembly, each cable duct assembly comprising:

a base;

a front rib extending up from said base;

a rear rib extending up from said base;

at least one traverse rib connecting a portion of said front rib to a portion of said rear rib;

a first elbow formed on an end of said front rib, said first elbow extending from said front rib;

an opening bar hinged to an end of said first elbow; and a second elbow formed on an end of said rear rib, said second elbow having an end which is closer to said rear rib than said opening bar is to said front rib when said opening bar is extended from said front rib; and knurls formed on the outer surface of said opening bar.

23. A cable duct device, comprising:

a first cable duct assembly and a second cable duct assembly symmetrical to and symmetrically arranged to said first cable duct assembly, each cable duct assembly comprising:

a base;

a front rib extending up from said base;

a rear rib extending up from said base;

at least one traverse rib connecting a portion of said front rib to a portion of said rear rib;

a first elbow formed on an end of said front rib, said first elbow extending from said front rib;

an opening bar hinged to an end of said first elbow; and a second elbow formed on an end of said rear rib, said second elbow having an end which is closer to said rear rib than said opening bar is to said front rib when said opening bar is extended from said front rib, each of said cable duct assemblies having a through hole in said base.

24. The cable duct device of claim 23, each of said cable duct assemblies having a plurality of through holes in the base.

25. A cable duct device, comprising:

a first cable duct assembly and a second cable duct assembly symmetrical to and symmetrically arranged to said first cable duct assembly, each cable duct assembly comprising:

a base;

a front rib extending up from said base;

a rear rib extending up from said base;

at least one traverse rib connecting a portion of said front rib to a portion of said rear rib;

a first elbow formed on an end of said front rib, said first elbow extending from said front rib;

an opening bar hinged to an end of said first elbow; and a second elbow formed on an end of said rear rib, said second elbow having an end which is closer to said rear rib than said opening bar is to said front rib when said opening bar is extended from said front rib, each of said cable duct assemblies having a leg formed on the opposite side of said base from the direction of extent of said first and second ribs.

26. The cable duct device of claim 25, further comprising a second leg on said opposite side of the base.

27. The cable duct device of claim 26, said legs being formed near the edge of the base opposite to the edge from which the front and rear ribs extend.

28. A cable duct device, comprising:

a first cable duct assembly and a second cable duct assembly symmetrical to and symmetrically arranged to said first cable duct assembly, each cable duct assembly comprising:

a base;

a front rib extending up from said base;

a rear rib extending up from said base;

at least one traverse rib connecting a portion of said front rib to a portion of said rear rib;

a first elbow formed on an end of said front rib, said first elbow extending from said front rib;

an opening bar hinged to an end of said first elbow; and a second elbow formed on an end of said rear rib, said second elbow having an end which is closer to said rear rib than said opening bar is to said front rib when said opening bar is extended from said front rib, said first and second cable duct assemblies being arranged with an edge of said base of said first cable duct assembly adjacent to the symmetrically corresponding edge of said base of said second cable duct assembly.

29. A method of forming a cable duct device, comprising:

assembling a first duct assembly and a second duct assembly, and coupling said first and second duct assemblies together to form the cable duct device defining a cable receiving space, said first and second duct assemblies being substantially identical, said assembling of said first duct assembly comprising:

extending a front rib and a second rib upwardly from a base;

connecting said front rib to said second rib with at least one traverse rib;

extending a first elbow from an upper end of said front rib, said first elbow having a first end contacting said front rib and having a second end;

extending a second elbow from an upper end of said rear rib, said second elbow having a first end contacting said rear rib and having a second end; and hingeably connecting an opening bar to said second end of said first elbow, said opening bar hinging between a first position closing the cable receiving space and a second position opening the cable receiving space.

30. The method of claim 29, said opening bar extending a first distance away from said front rib when said opening bar is in the first position closing the cable receiving space, said second elbow extending a second distance away from said rear rib, said first distance being greater than said second distance.

31. The method of claim 30, said opening bar being spaced apart from said front rib by said first elbow and being located on a top side of the cable duct device.

32. The method of claim 30, said opening bar extending a third distance away from said front rib when said opening bar is in the second position opening the cable receiving space, said third distance being less than said first distance.

33. The method of claim 32, said opening bar being spaced apart from said front rib by said first elbow and being located on a top side of the cable duct device.

34. The method of claim 29, said opening bar being spaced apart from said front rib by said first elbow and being located on a top side of the cable duct device.

35. The method of claim 29, said base, said front rib, and said rear rib being substantially rigid and being joined together rigidly, and rigidly forming the cable receiving space.

* * * * *